United States Patent [19]

Speece

[11] 4,064,750

[45] Dec. 27, 1977

[54] GAS FLOW TOTALIZER

[76] Inventor: Richard E. Speece, 2123 Reynolds St., Falls Church, Va. 22043

[21] Appl. No.: 691,763

[22] Filed: June 1, 1976

[51] Int. Cl.² ............................................. G01F 3/00
[52] U.S. Cl. ..................................... 73/194 R; 73/200
[58] Field of Search ..................... 73/194 R, 200, 217, 73/218

[56] References Cited

U.S. PATENT DOCUMENTS 2,936,618   5/1960   Milam ................................... 73/200

Primary Examiner—Richard C. Queisser
Assistant Examiner—Anthony V. Ciarlante
Attorney, Agent, or Firm—Clarence A. O'Brien; Harvey B. Jacobson

[57] ABSTRACT

An inverted bucket having a pair of gas entrapping compartments alternatively positioned over the gas discharging end of an inlet conduit submerged within a body of liquid. The bucket is pivotally displaced between its operative positions by the buoyant force exerted by a preset quantity of gas accumulated. The gas is accumulated in one compartment while the gas previously accumulated in the other compartment escapes. Displacement of the bucket is detected and registered by a counter mechanism.

14 Claims, 12 Drawing Figures

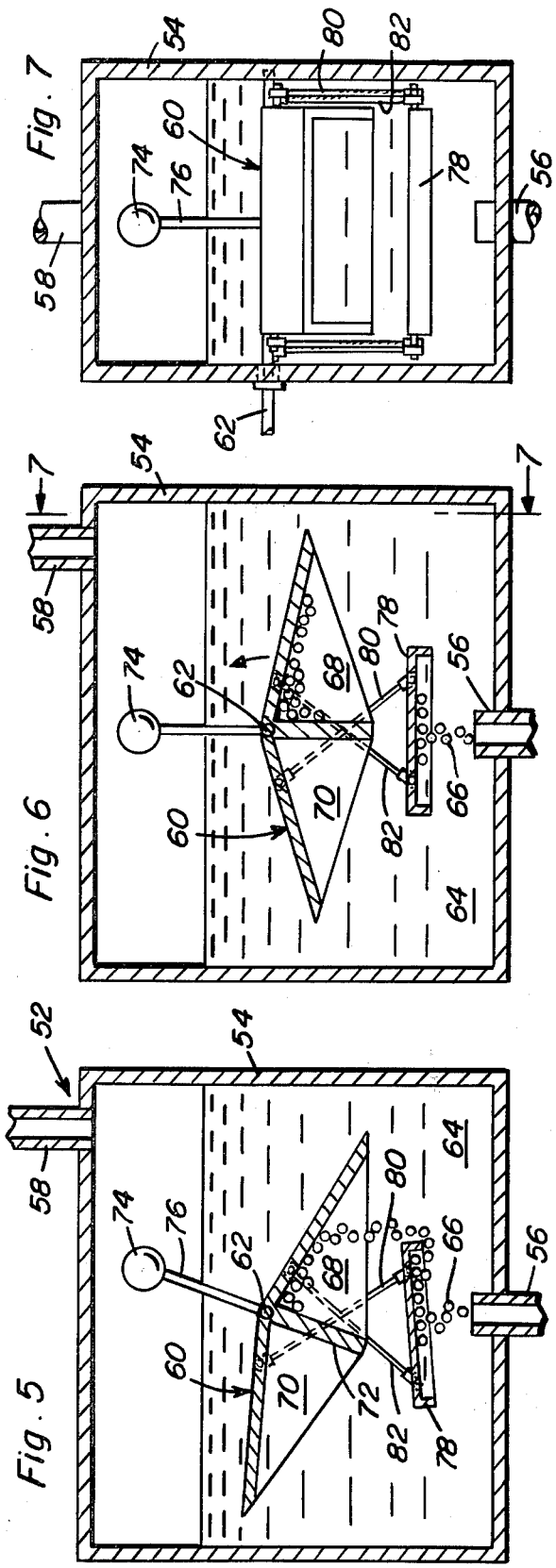
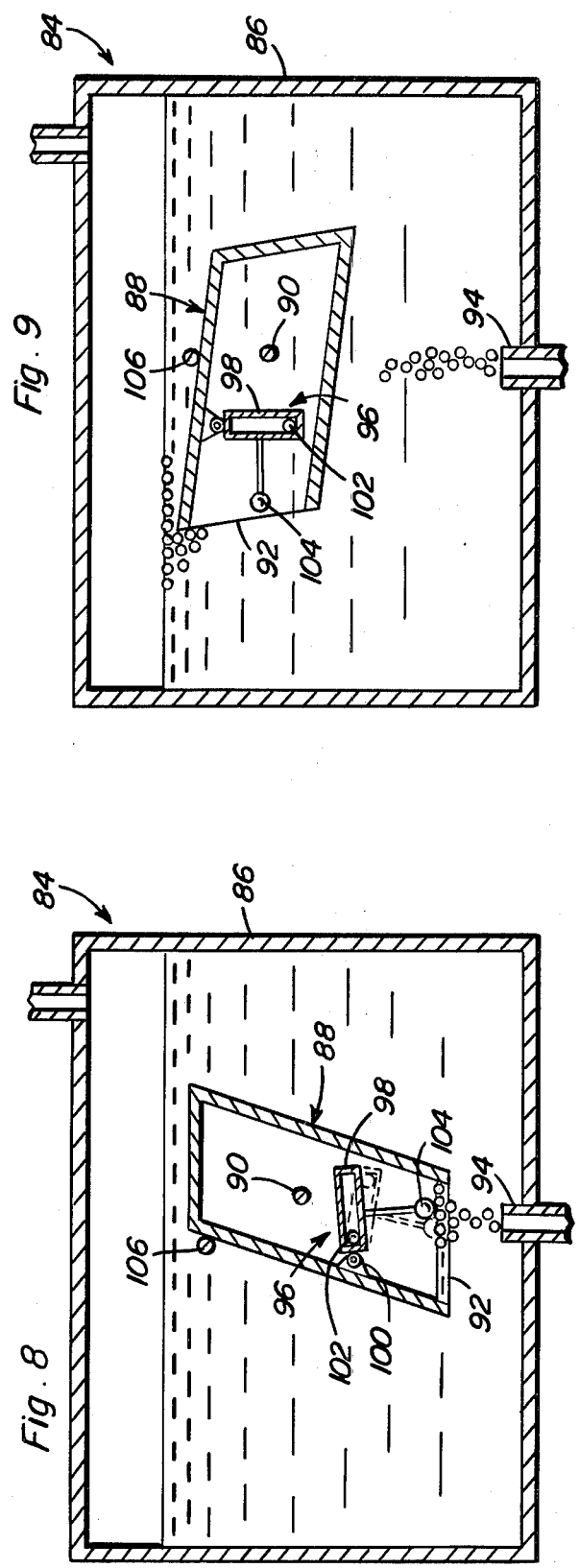

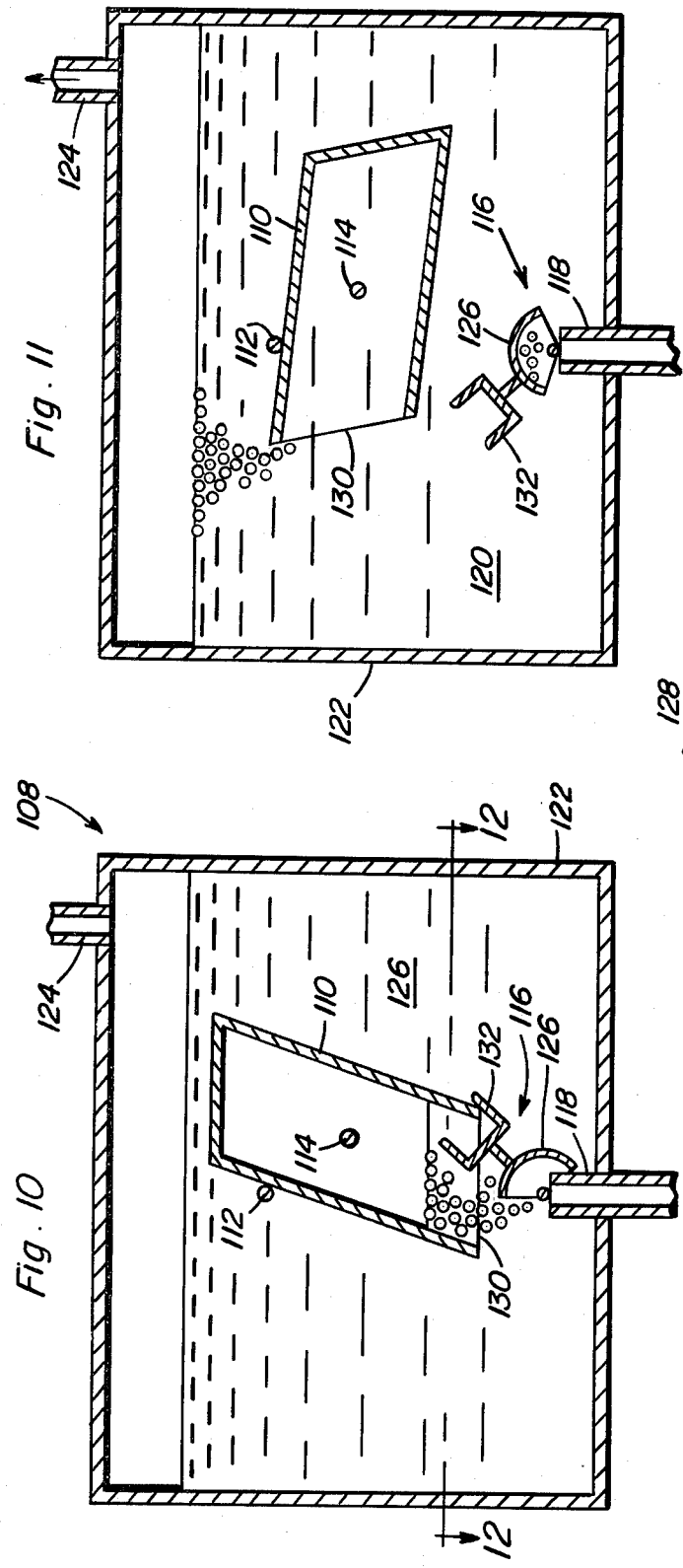
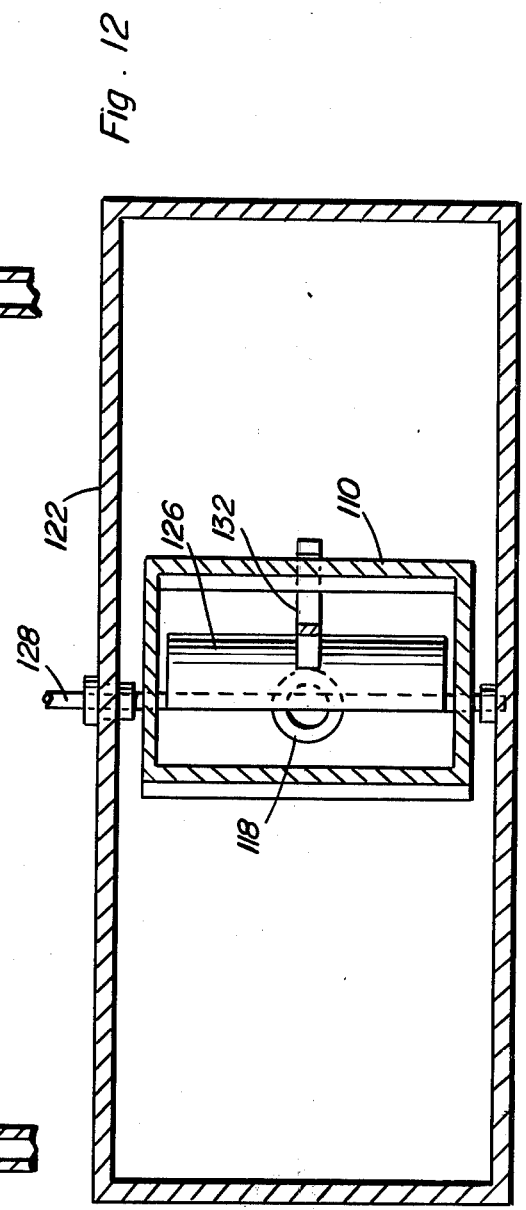

GAS FLOW TOTALIZER

This invention relates generally to the metering of gas flow and in particular to gas flow meters of the type in which a preset quantity or volumetric unit of gas is accumulated for metering purposes.

Accumulative gas flow meters are generally known. In such flow meters, a preset quantity of fluid is accumulated to cause displacement of a metering element, such displacement being registered by a counter. Most flow meters of the foregoing type are either inaccurate or rather complex. The use of floats and the buoyancy force principle in flow meters are also known. However, use of the buoyancy principle has not been successfully adapted to accurate metering of gas flow in a simple and economical manner.

The following U.S. patents known to applicant are related to the subject matter of the present invention: U.S. Pat. Nos. 2,936,618; 2,938,380; 234,275; and 3,240,068.

In accordance with the present invention a counterbalanced, pivoted float in the shape of an inverted bucket, directly entraps gas conducted into a body of liquid within which the bucket is submerged. Accumulation of a preset quantity of gas causes the bucket to pivot under the buoyant force exerted. The accumulated gas may then escape from the bucket. Each displacement of the bucket is registered by a counter to meter flow. In certain embodiments, the gas is entrapped alternatively on opposite sides of a partition dividing the bucket into two compartments rspectively positioned over the discharge end of the gas inlet conduit. In other embodiments, gas is temporarily stored in a collector during displacement of the bucket to prevent loss of gas and measurement error.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 5 is a side sectional view of another embodiment of a metering device in accordance with the present invention.

FIG. 6 is a side sectional view of the metering device of FIG. 5 in another position.

FIG. 7 is a transverse section view taken substantially through a plane indicated by section line 7—7 in FIG. 6.

FIG. 8 is a side section view through yet another metering device constructed in accordance with the present invention.

FIG. 9 is a side section view of the metering device shown in FIG. 8 in another position.

FIG. 10 is a side section view of a still further embodiment.

FIG. 11 is a side section view of the metering device shown in FIG. 10 in another position.

FIG. 12 is a top section view taken substantially through a plane indicated by section line 12—12 in FIG. 11.

Figure 1:
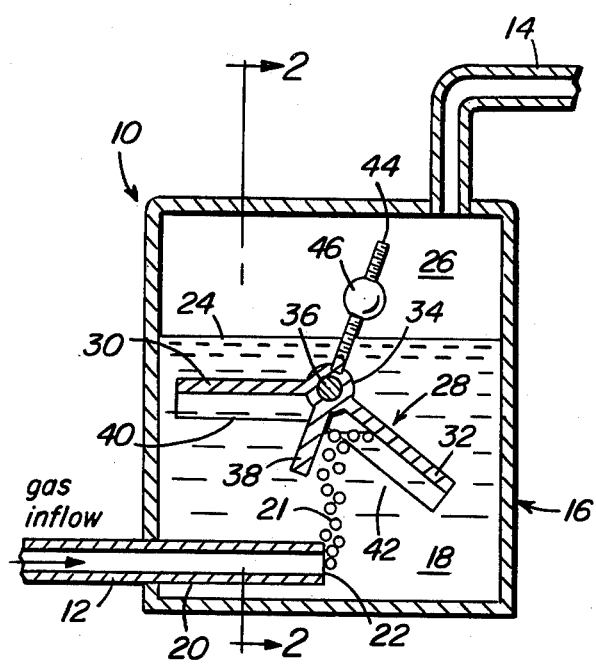
FIG. 1 is a side sectional view through a metering device constructed in accordance with the present invention.
Figure 2:
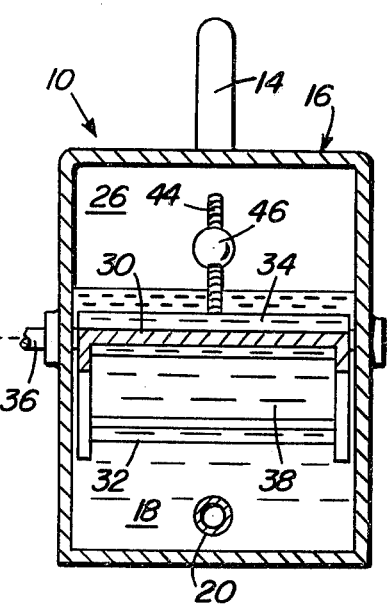
FIG. 2 is a transverse sectional view taken substantially through a plane indicated by section line 2—2 in FIG. 1.

Referring now to the drawings in detail, FIGS. 1 and 2 illustrate as one embodiment of the invention, a flow metering device generally denoted by reference numeral 10. The metering device is arranged to measure the quantity of fluid, such as a gas under pressure, flowing between conduit sections 12 and 14. In this embodiment of the invention, the inlet conduit section 12 is connected to the lower portion of a container 16 enclosing a body of fluent medium 18 immiscible with the gas and of greater density. A liquid, such as water, may be utilized as the fluent medium. The gas is discharged into the liquid by an inlet extension 20 connected to the conduit section 12 and forms bubbles 21 which ultimately rise from the location 22 adjacent the bottom of the container to the surface 24 of the body of liquid into the gas space 26 from which the gas is conducted by the outflow conduit section 14.

Figure 3:
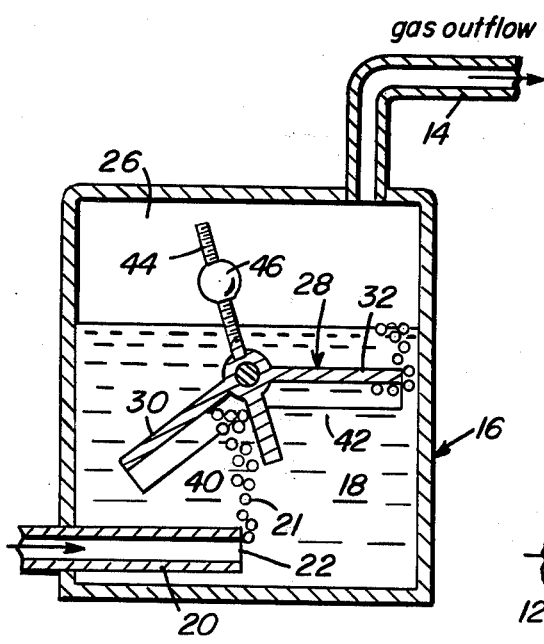
FIG. 3 is a side sectional view similar to FIG. 1 showing the metering device in another operative position.

The gas bubbles 21 rising from location 22 are temporarily entrapped within an inverted bucket assembly generally denoted by reference numeral 28. The bucket assembly includes a pair of downwardly diverging walls 30 and 32 submerged within the body of liquid. The diverging walls extend radially from a pivotal sleeve 34 secured to a pivot shaft 36 suitably journaled on the side walls of the container 16 to establish a fixed pivotal axis for the bucket assembly. A partition 38 projects radially from the sleeve 34 in angular bisecting relation to the diverging walls 30 and 32 so as to form two gas entrapping compartments 40 and 42 between the walls 30 and 32. The pivotal axis established by the pivot shaft 36 is substantially aligned in vertically spaced relation above the gas discharging location 22 as shown in FIG. 1, so that in the operative position of the bucket assembly as shown, the gas bubbles emerging from the inlet extension 20 will be entrapped within compartment 42. In this position, the wall 32 is inclined downwardly in diverging relation to partition 38 on one side of a vertical extending from the pivot shaft axis to location 22 opposite the partition, while the wall 30 extends slightly upwardly from the horizontal on the side of the partition opposite the wall 32. When the bucket assembly is pivotally displaced to its other operative position as shown in FIG. 3, there is a reversal in function of the compartments 40 and 42, with the gas bubbles being received in compartment 40 while the gas previously entrapped in compartment 42 escaping. Thus, in FIG. 3, wall 30 occupies a downwardly inclined position to align compartment 40 over the location 22 while wall 32 extends slightly upwardly from the horizontal to permit escape of the gas from compartment 42.

In the embodiment shown in FIGS. 1 and 2, an elongated mounting rod 44 extends radially upwardly from sleeve 34 in radial alignment with partition 38. A counterweight 46 is adjustably positioned on the rod 44 which may be externally threaded for this purpose. The position of the counterweight 46 is adjusted so that the upward buoyant force exerted by the accumulation of a desired quantity of gas in compartment 40 or 42 will produce a pivotal displacing moment causing the bucket assembly to tip and rapidly move between the operative positions shown in FIGS. 1 and 3. Once the counterweight moves past dead-center position corresponding to the vertical between the pivot shaft and location 22, the bucket assembly will be held in the operative positions shown until sufficient gas is once again accumulated in compartment 40 or 42. Also, while one compartment is entrapping and accumulating gas therein, the gas previously entrapped in the other compartment escapes to restore control to the counterweight in opposing the increasing displacing moment created by accumulating gas. The foregoing action permits the accumulation of an accurately adjusted quantity of gas in each compartment with substantially no loss of gas during displacement of the bucket assembly between its operative positions.

To meter the flow of gas, each displacement of the bucket assembly corresponding to the passage of the preset quantity of gas through the metering device, is detected and registered by a suitable counter mechanism 48 as diagrammatically shown in FIG. 2. The counter mechanism may be of a type that is mechanically driven by a suitable driving connection to the pivot shaft 36, requiring no outside power source. Alternatively, pivotal displacement of the bucket assembly could be detected without mechanical loading by a suitable sensing device such as a reed switch actuated by a magnet coupled to the pivot shaft or a mercury switch attached to the pivot shaft. An electrical power operated counter could then be incremented by means of the sensing device to register the metered quantities of gas accumulated in the metering device. The output of the counter mechanism may be fed to a suitable calibrated readout system.

Figure 4:
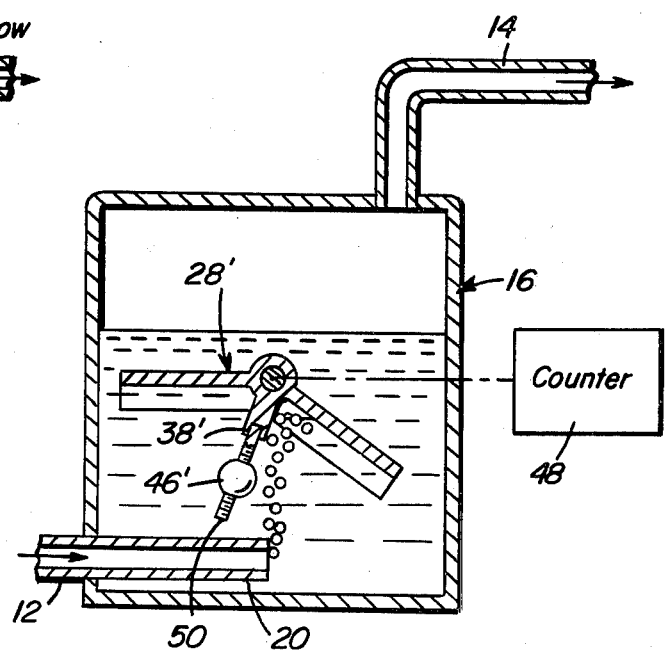
FIG. 4 is a side sectional view similar to FIG. 1 showing a modified form of metering device.

FIG. 4 shows a modification of the arrangement illustrated in FIGS. 1 and 2, wherein a counter buoy 46' is adjustably positioned on an extension 50 below the water level projecting from the partition 38' of an inverted bucket assembly 28'. The counter buoy 46' as well as the other parts serve substantially the same functions as corresponding parts of metering device 10.

FIGS. 5, 6 and 7 illustrate a type of metering device 52 similar to metering device 10 shown in FIGS. 1-3, but embodying means to store incoming gas during the transition interval when the bucket is being pivotally displaced between its operative positions to thereby avoid measurement errors resulting from loss of gas during the transition interval. The metering device 52 thus includes a container 54 through which gas flows from inlet 56 to outlet 58. An inverted bucket 60 is pivotally mounted by pivot shaft 62 within the container 54 submerged in the body of liquid 64 through which the gas bubbles 66 rise from the inlet 56. The gas bubbles are entrapped within compartment 68 as shown in FIG. 5 or compartment 70 when the bucket is displaced to its other position, the compartments being separated by divider 72. A counterweight 74 connected to the bucket by rod 76 gravitationally biases the bucket to either of its gas entrapping positions. It will be appreciated however, that there will be some lag time during pivotal movement of the bucket when gas bubbles continue to rise without accumulation in either compartment prior to the end of pivotal movement. To avoid loss of such gas, a collector pan 78 is provided.

The collector pan 78 is suspended from the bucket by two pair of crossing links 80 and 82. In the intermediate position of the bucket as shown in FIG. 6, the links support the inverted collector pan 78 in a horizontal position centrally aligned above the inlet 56 so as to entrap and store the gas during movement of the bucket between its two end positions under the urge of buoyant forces overcoming the bias of counterweight 74. In the end position of the bucket however, the collector pan 78 will be tilted as shown in FIG. 5 to permit escape of gas bubbles into compartment 68 or 70. Except for the temporary storage of gas under collector pan 78, the metering device 52 operates in the same fashion as described with respect to FIGS. 1-3.

A somewhat different type of metering device 84 is shown in FIGS. 8 and 9 wherein the container 86 pivotally mounts a rhombic-parallelepiped shaped bucket 88 by means of a pivot shaft 90 to which the counter is connected externally of the container. One longitudinal end 92 of the bucket is open to receive gas bubbles from inlet 94 as shown in FIG. 8 causing the bucket to pivot toward the position shown in FIG. 9 when a predetermined quantity of gas is accumulated therein. When this condition occurs the bucket is rapidly displaced to promptly empty the accumulated gas and return to its vertical position before there is any loss of gas bubbles. Rapid pivotal movement is enforced by a moment amplifying device 96 connected to the bucket.

The device 96 includes an elongated float element 98 pivotally mounted at one end inside the bucket by pivot bracket 100. A weighted ball or sphere 102 is displaceable between a balanced position as shown by solid line in FIG. 8 at the left end of element 98 and an unbalanced position at the right end. A float 104 depending from element 98 urges it in a counterclockwise direction as viewed in FIG. 8 counterbalanced by the ball weight 102 to hold element 98 slightly tilted upwardly so that the ball 102 remains at the left end. In response to initial displacement of the bucket 88 when a predetermined quantity of gas is accumulated therein, the element 98 is tilted downwardly from the horizontal causing the ball to roll toward the right end remote from pivot bracket 100 as shown by dotted line in FIG. 8. This shift in position of ball 102 increases the turning moment on the bucket causing it to pivot more rapidly to the position shown in FIG. 9. In the position of the bucket shown in FIG. 9, the gas is rapidly displaced therefrom and escapes. Filling of the bucket with liquid creates a resultant restoring moment causing the bucket to return to the position shown in FIG. 8 at which point the ball 102 shifts back to its left hand position in element 98. A fixed stop 106 may limit movement of the bucket between the two positions shown while the pivot shaft 90 will be connected to a counter to register the flow of gas as indicated with respect to FIG. 2.

FIGS. 10, 11 and 12 illustrate yet another embodiment 108 of the invention utilizing a bucket 110 similar in shape to the bucket 88 of metering device 84 shown in FIGS. 8 and 9. The bucket 110 is also pivotally displaceable between positions shown in FIGS. 10 and 11 abutting fixed stop 112 to register gas flow through a counter connected to pivot shaft 114. A gas storing device 116 is provided to temporarily store gas rising from inlet 118 through the liquid 120 in container 122 from which the gas is withdrawn through outlet 124. This gas storing device prevents gas loss during movement of the bucket 110 to prevent flow rate metering error as in the case of the metering device 52 of FIGS. 5-7.

The gas storing device 116 includes an arcuate collector 126 pivotally mounted by pivot shaft 128 above the inlet 118 and below the open end 130 of the bucket in the limit position shown in FIG. 10. A yoke element 132 is connected to the collector 126 and projects upwardly therefrom for engagement with the bucket to hold the collector in a non-storing position as shown in FIG. 10. Gas will accordingly rise into the bucket and accumulate therein. When a predetermined quantity of gas has accumulated, a turning moment is created to cause pivotal movement of the bucket toward the limit position shown in FIG. 11. The yoke element 132 is disengaged from the bucket as it pivots towards the gas discharging position permitting the collector to assume a balanced central position above the inlet as shown in FIG. 11. In this position, the collector will temporarily store gas to prevent its loss until the bucket is returned to its gas accumulating position shown in FIG. 10 after all the gas is discharged therefrom. Thus, a counter connected to pivot shaft 114 accurately meters the flow of gas between the inlet and outlet.

The metering devices 10 and 84 will be suitable for metering flow at relatively low flow rates. Because of the snap-action effect of device 96, larger gas quantities may be accumulated to reduce the number of displacements that must be counted. For more rapid flow rate measurements metering devices 52 and 108 will be more suitable to avoid loss errors as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a meter for measuring the flow of a fluid through a conduit, a container connected to said conduit and through which said fluid flows, a static body of fluent medium of substantially constant quantity enclosed within said container and having a density greater than said fluid, inlet means connected to said conduit for discharging the fluid into the body of fluent medium from a predetermined location therewithin, fluid entrapping means submerged within the body of fluent medium for displacement in response to accumulation of a predetermined quantity of the fluid prior to separation from the body of fluent medium, and means mounting the fluid entrapping means for displacement between operative receiving and releasing positions in which the fluid is accumulated within the entrapping means and escapes therefrom, respectively.

2. The combination of claim 1 including means for detecting said displacement of the entrapping means between said operative positions thereof and means operatively connected to the detecting means for registering the passage of said predetermined quantity of the fluid into the container.

3. The combination of claim 1 including means connected to the fluid entrapping means for amplifying the turning and restoring moments causing displacement thereof in reponse to initial movement of the fluid entrapping means from the fluid receiving position.

4. In a meter for measuring the flow of a fluid through a conduit, a container connected to said conduit and through which said fluid flows, a body of fluent medium enclosed within said container having a density greater than said fluid, inlet means connected to said conduit for discharging the fluid into the body of fluent medium from a predetermined location therein, fluid entrapping means submerged within the body of fluent medium for displacement in response to accumulation of a predetermined quantity of the fluid therein, and means operatively mounting the fluid entrapping means for displacement between operative receiving and releasing positions in which the fluid is accumulated within the entrapping means and escapes therefrom, respectively, said fluid entrapping means comprising an inverted bucket having a pair of diverging walls and a partition between said walls forming fluid-receiving compartments alternatively aligned above said predetermined location in said operative positions.

5. The combination of claim 4 wherein said mounting means includes a pivot device for establishing a fixed pivotal axis about which the fluid entrapping means is displaced between said operative positions thereof.

6. The combination of claim 5 including adjustable means operatively connected to the fluid entrapping means for varying the predetermined quantity of fluid accumulated.

7. The combination of claim 6 wherein said fluent medium is a liquid immiscible with the fluid.

8. The combination of claim 7 wherein said fluid is a gas.

9. The combination of claim 8 including means for detecting said displacement of the entrapping means between said operative positions thereof and means operatively connected to the detecting means for registering the passage of said predetermined quantity of the fluid into the container.

10. The combination of claim 6 wherein said adjustable means includes a counterweight, and elongated means projecting from the fluid entrapping means in alignment with the partition on which the counterweight is positioned.

11. A device for metering the flow of a gas comprising a container, a static body of constant volume liquid substantially immiscible with the gas enclosed within the container, means discharging the gas into said body of liquid for passage through said container, gas entrapping bucket means pivotally mounted within the container for accumulation of a predetermined quantity of the gas discharged into the body of liquid prior to separation therefrom, and counter means operatively connected to the bucket means for registering each displacement of the bucket means by said accumulation of gas therein.

12. In a meter for measuring the flow of a fluid through a conduit, a container connected to said conduit and through which said fluid flows, a body of fluent medium enclosed within said container having a density greater than said fluid, inlet means connected to said conduit for discharging the fluid into the body of fluent medium from a predetermined location therein, fluid entrapping means submerged within the body of fluent medium for displacement in response to accumulation of a predetermined quantity of the fluid therein, means operatively mounting the fluid entrapping means for displacement between operative receiving and releasing positions in which the fluid is accumulated within the entrapping means and escapes therefrom, respectively, and means for storing the fluid discharged from the inlet means only during movement of the fluid entrapping means between the positions thereof.

13. The combination of claim 12 wherein said fluid storing means includes a collector, means operatively positioning the collector intermediate the inlet means and the fluid entrapping means for intercepting fluid entering the fluid entrapping means, and means responsive to movement of the fluid entrapping means to the fluid receiving position for displacing the collector to a non-blocking position permitting flow of the fluid into the fluid entrapping means.

14. In a meter for measuring the flow of a fluid through a conduit, a container connected to said conduit and through which said fluid flows, a body of fluent medium enclosed within said container having a density greater than said fluid, inlet means connected to said conduit for discharging the fluid into the body of fluent medium from a predetermined location therein, fluid entrapping means submerged within the body of fluent medium for displacement in response to accumulation of a predetermined quantity of the fluid therein, means operatively mounting the fluid entrapping means for displacement between operative receiving and releasing positions in which the fluid is accumulated within the entrapping means and escapes therefrom, and means connected to the fluid entrapping means for amplifying the turning and restoring moments causing displacement thereof in response to initial movement of the fluid entrapping means from the fluid receiving position, said amplifying means including a float element pivotally connected to the fluid entrapping means and movable weight means mounted on the float element for displacement from a counterbalanced position to an unbalanced position exerting a turning or restoring moment on the fluid entrapping means.

* * * * *